(12) United States Patent
Brulez et al.

(10) Patent No.: US 9,738,382 B2
(45) Date of Patent: Aug. 22, 2017

(54) DRONE IMMERSION-PILOTING SYSTEM

(71) Applicant: PARROT DRONES, Paris (FR)

(72) Inventors: Nicolas Brulez, Pomponne (FR); Arsene Ferrand, Paris (FR); Henri Seydoux, Paris (FR)

(73) Assignee: Parrot Drones, Paris (FR)

( * ) Notice: Subject to any disclaimer, the term of this patent is extended or adjusted under 35 U.S.C. 154(b) by 0 days.

(21) Appl. No.: 15/087,825

(22) Filed: Mar. 31, 2016

(65) Prior Publication Data
US 2016/0297522 A1 Oct. 13, 2016

(30) Foreign Application Priority Data

Apr. 10, 2015 (FR) ...................... 15 53091

(51) Int. Cl.
*B64C 39/02* (2006.01)
*G06T 19/20* (2011.01)
*G06F 3/01* (2006.01)
*B64D 47/08* (2006.01)
*G06T 19/00* (2011.01)
*A63H 27/00* (2006.01)

(52) U.S. Cl.
CPC .......... *B64C 39/024* (2013.01); *A63H 27/12* (2013.01); *B64D 47/08* (2013.01); *G06F 3/012* (2013.01); *G06T 19/006* (2013.01); *G06T 19/20* (2013.01); *B64C 2201/108* (2013.01); *B64C 2201/127* (2013.01)

(58) Field of Classification Search
CPC ............................ G05D 1/0044; G05D 1/0038
USPC ......................................................... 345/633
See application file for complete search history.

(56) References Cited

U.S. PATENT DOCUMENTS

| 5,240,207 | A | * | 8/1993 | Eiband | G05D 1/0038 244/190 |
| 5,610,678 | A | * | 3/1997 | Tsuboi | G02B 27/017 348/341 |
| 7,312,766 | B1 | * | 12/2007 | Edwards | G02B 27/017 248/115 |
| 8,903,568 | B1 | | 12/2014 | Wang et al. | |
| 9,268,136 | B1 | * | 2/2016 | Starner | G02B 27/017 |

(Continued)

FOREIGN PATENT DOCUMENTS

| CN | 102043410 A | 5/2011 |
| EP | 2364757 A1 | 9/2011 |

(Continued)

*Primary Examiner* — Kimberly A Williams
(74) *Attorney, Agent, or Firm* — Haverstock & Owens LLP

(57) ABSTRACT

The system comprises a drone and a ground station with a console adapted to be directed towards the drone, and virtual reality glasses rendering images taken by a camera of the drone. The system further comprises means for modifying the framing of the images taken by the camera as a function of framing instructions received from the ground station. It further comprises relative heading determination means (302-324) for periodically elaborating an angular difference between the orientation of the glasses and the orientation of the console, and means (316) for elaborating framing instructions for the drone as a function said angular difference. The sudden changes of framing when the user simply turns the console and his whole body, head included, towards the drone to follow it in its displacements, are hence avoided.

10 Claims, 3 Drawing Sheets

(56) References Cited

U.S. PATENT DOCUMENTS

| | | | |
|---|---|---|---|
| 9,350,954 B2* | 5/2016 | Wagreich | G05D 1/0038 |
| 2012/0287284 A1* | 11/2012 | Jacobsen | G06F 1/163 |
| | | | 348/158 |
| 2013/0307842 A1* | 11/2013 | Grinberg | G06F 3/1431 |
| | | | 345/419 |
| 2015/0294505 A1* | 10/2015 | Atsmon | G06T 19/006 |
| | | | 345/633 |
| 2015/0341540 A1* | 11/2015 | Kim | H04N 5/23203 |
| | | | 348/144 |
| 2016/0313732 A1* | 10/2016 | Seydoux | G02B 27/0172 |

FOREIGN PATENT DOCUMENTS

| | | |
|---|---|---|
| JP | 2003-267295 A | 9/2003 |
| WO | WO2010/061099 A2 | 6/2010 |

\* cited by examiner

DRONE IMMERSION-PILOTING SYSTEM

The invention relates to rotary-wing drones such as quadricopters or the like.

Such drones are provided with multiple rotors driven by respective motors, which can be controlled in a differentiated manner so as to pilot the drone in attitude and speed.

The AR.Drone 2.0 or the Bebop Drone of Parrot SA, Paris, France are typical examples of such quadricopters. They are equipped with a series of sensors (accelerometers, 3-axe gyrometers, altimeter), a front camera capturing an image of the scene towards which the drone is directed, and a vertical-view camera capturing an image of the overflown ground.

The WO 2010/061099 A2 and EP 2 364 757 A1 (Parrot SA) describe such a drone as well as the principle of piloting thereof through a touch-screen multimedia telephone or media player having an integrated accelerometer, for example a cellular phone of the iPhone type or a multimedia tablet of the iPad type (registered trademarks of Apple Inc. USA). These devices incorporate the various control elements required for the detection of the piloting commands and the bidirectional exchange of data with the drone via un wireless link of the Wi-Fi (IEEE 802.11) or Bluetooth (registered trademark) local network type. They are further provided with a touch screen displaying the image captured by the front camera of the drone, with, in superimposition, a certain number of symbols for the activation of commands by simple contact of the user's finger on the touch screen.

The front video camera of the drone can be used in particular for a piloting in "immersive mode" or FPV (First-Person View) mode, i.e. where the user uses the image of the camera in the same way as if he was himself on board the drone. It may also serve to capture sequences of images of a scene towards which the drone is directed. The user can hence use the drone in the same way as a camera or a camcorder that, instead of being held in hand, would be borne by the drone. The collected images can be recorded, broadcast, put online on video-hosting web sites, sent to other Internet users, shared on social networks, etc.

In the Bebop Drone system marketed by the applicant, the user visualizes directly the image taken by the drone on the ground station marketed under the name Skycontroller, and can control the angle of view of the camera by means of the touch interface of the tablet of the iPad type with which the ground station is equipped. This view angle command acts on a digital framing and distortion correction processing applied to the image taken by the camera, of the fisheye type, so as to simulate a physical movement of the axis of the camera towards the left, the right, the top and the bottom.

Moreover, the ground station has a video output for the connexion of FPV glasses for a piloting in immersive mode.

However, this immersive mode reaches its limits insofar as the displayed image is only dependent on the touch commands of the user, without taking into account the position of the latter and in particular of his head.

The present invention aims, in a system including a drone, a ground piloting station and FPV glasses, to permit to naturally guide the drone while allowing the user, in a particularly simple, intuitive and non-disturbing manner, to modify the framing of the image rendered in the video image.

The U.S. Pat. No. 8,903,568 B1 proposes to pilot a drone, or an orientable cradle carrying a camera, as a function of the movements of the user's head, movements that are detected by sensors mounted on glasses or on a headset worn by the user. By turning his head aside or up or down, the user can hence control a change of attitude of the drone or orientation of the camera.

However, this system is not sheltered from sudden changes of attitude of the drone or orientation of the camera when the user turns the console with his whole body, head included, towards the drone, for example to follow the displacements of this latter. Indeed, such a rotation is interpreted by the system as a rotation intended to generate a command, while it was not the intention of the user, so that the latter will rapidly lose his marks, the drone becoming impossible to pilot in the wanted direction.

Such is the problem that the present invention endeavour to solve.

For that purpose, the invention proposes a drone piloting system of the general type disclosed in the above-mentioned U.S. Pat. No. 8,903,568 B1, i.e. comprising a drone provided with imaging means and a ground station communicating with the drone through a wireless link. The ground station comprises a console adapted to be directed towards the drone to maintain the quality of the wireless link and virtual reality glasses rendering images taken by means of the imaging means and transmitted from the drone through the wireless link. The system further comprises means for modifying the framing of the images taken by the imaging means as a function of framing instructions received from the ground station.

Characteristically of the invention, the system further comprises:
relative heading determination means for periodically elaborating an angular difference between the orientation of the glasses and the orientation of the console, and
means for elaborating framing instructions for the drone as a function of said angular difference.

Hence, the system causes a framing only when the user's head turns, around the yaw axis (laterally) and preferably also around the pitch axis (upward and downward), with respect to the console and hence with respect to his whole body, with respect to which the console is held and/or fastened, and does not cause framing when the user turns the console with his whole body, head included.

The system also optionally comprises the following advantageous characteristics, taken individually or according to any combination that the one skilled in the art will recognize as technically compatible:

the relative heading determination means comprise an inertial unit associated with the ground station and processing means for determining a heading of the console with respect to a reference;

the inertial unit associated with the console comprises a magnetometer, and the reference is constituted by the magnetic North;

the relative heading determination means comprise an inertial unit associated with the glasses and processing means for determining a heading of the glasses with respect to a reference;

the inertial unit associated with the glasses comprises an magnetometer and the reference is consisted by the magnetic North;

the heading determination means comprise means for estimating the glasses heading by integration of speed and/or acceleration data generated in the glasses, initialization means for determining an offset between the console heading and the estimated heading of the glasses when a physical correspondence of heading between the console and the glasses is triggered by an operator, and means for determining a corrected heading of the glasses from the estimated heading and the offset;

the relative heading determination means comprise means of subtraction between the angular values of the console heading and of the glasses heading;

the orientation of the console and the orientation of the glasses comprise at least one yaw and/or pitch orientation;

the framing modification means comprise digital processing means for framing and correcting a fixed video image of the fisheye type taken by the imaging means;

the system further comprises means for superimposing to the image rendered in the virtual reality glasses a drone heading indicator.

An exemplary embodiment of a system for image transmission between a drone and a ground station according to the invention will now be described, with reference to the appended drawings in which the same references denote identical or functionally similar elements throughout the figures.

FIG. 1 schematically illustrates a drone and ground station unit of the market, to which the invention is advantageously applied.

An exemplary embodiment of the device of the invention will now be described.

A immersion imaging (First-Person View) system according to the present invention comprises a drone equipped with at least one imaging camera, a ground station communicating through a wireless link of suitable range with the drone and virtual reality glasses, provided with means for rendering in front of the user's eyes images giving him the feeling to fly on board the drone, in the most realistic way possible (flight said in First Person View or FPV mode).

In this example, the drone comprises a single camera with a fisheye-type lens, but could as a variant include a set of cameras, and digital processing means located on board and/or provided in the ground station, making it possible to combine the images of the various cameras.

Figure 1:
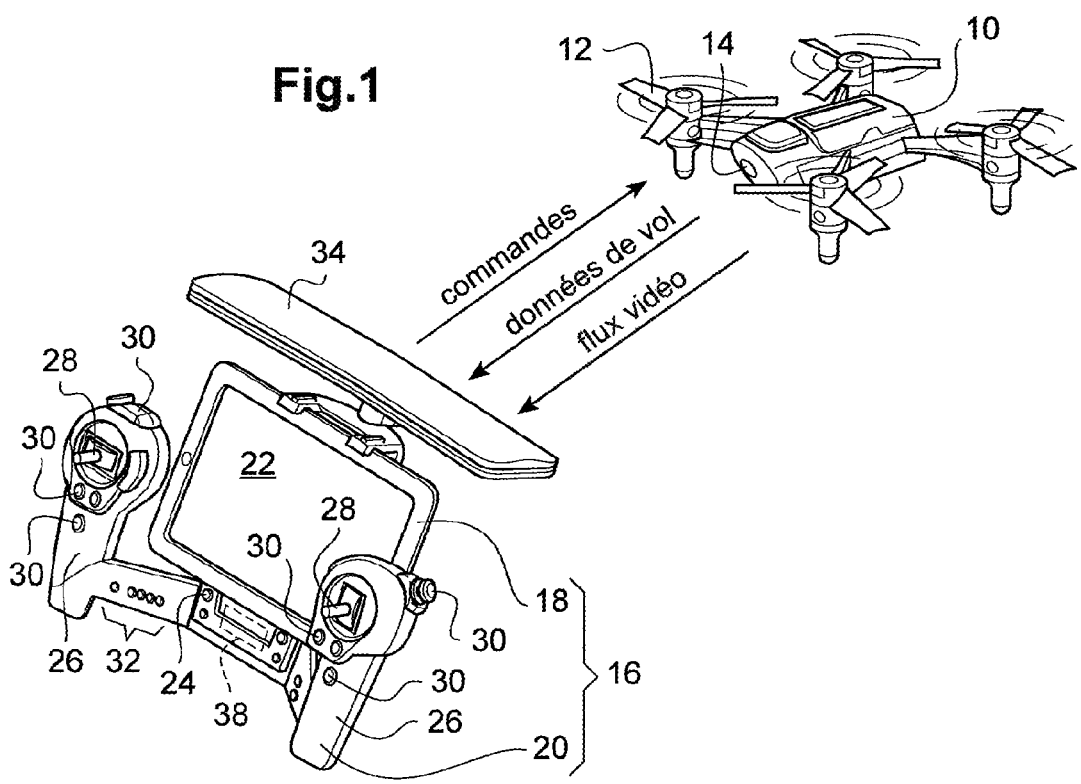

In FIG. 1, the reference 10 generally designates the drone, for example a flying drone of the quadricopter type, such as the Bebop model of Parrot SA, Paris, France. This drone includes four coplanar rotors 12, whose motors are piloted independently by an integrated navigation and attitude control system. The drone also includes a front-view camera 14 making it possible to obtain a video image of the scene towards which is directed the drone, for example a high-definition camera with a CMOS sensor of resolution 1920× 1080 pixels with a refresh frequency of the video flow of 30 fps (frame per second), associated with a great-angle lens of the fisheye type.

The drone has also image processing and correcting means adapted to frame in real time or almost real time the images taken by the drone as a function of a direction to which the user wishes to look at, as will be seen hereinafter.

The drone is piloted by a ground station 16 comprising a remote-control console 20 associated with a tablet 18.

The tablet 18 is a conventional tablet, for example of the iPad type (registered trademark) or the like, including a visualization screen 22, and in which has been loaded an applicative software module for piloting the drone 10 and for visualizing the images taken by the on-board camera 14. The tablet 18 is moreover equipped with a data exchange radio interface, for example of the Wi-Fi type. It is a tablet of a standard model, not modified except the loading of the applicative software module.

The screen 22 of the tablet 18 displays the image of the scene captured by the on-board camera 14 of the drone with, in superimposition, a certain number of symbols allowing the control of various navigation parameters. This screen is a touch screen allowing the activation of piloting commands by simple contact of an operator's finger on the symbols displayed on the screen (up/down displacements, attitude control, etc.). Those actions are interpreted by the applicative software that transforms them into command signals intended to the drone, sent on the data exchange Wi-Fi interface.

Conversely, the flight data coming from the drone 10, received by the Wi-Fi interface, are delivered to the applicative software to be processed therein and possibly be displayed on the screen 22 of the tablet.

The production of commands from the touch screen of the tablet will however be used herein only subsidiarily, the different commands being duplicated and complemented by actions on various buttons and levers of the console 20.

More precisely, the console 20 includes a support 24 making it possible to fasten the tablet 18 to the console, in front of the operator so that the latter can see the totality of the surface of the screen 22. The body of the console 20 is extended on each side by handles 26 provided with various control members such as levers 28 of the "joystick" type and buttons 30 arranged within reach of the operators fingers and each associated with a particular command (take-off/landing, return to start point, triggering of the recording of the scene captured by the camera, etc.). The console 20 is also provided with various luminous indicators 32 (level of the drone battery, recording in progress, etc.), as well as connection arrangements (not shown) allowing the plugging of accessories as, for example, virtual reality glasses with an integrated screen, usable as an alternative to the visual display screen 22 of the tablet. As a variant, the accessories can communicate with the console through a wireless communication.

The console 20 is also provided with a long-range directional, directive Wi-Fi antenna 34, that the operator directs towards the drone when he has the remote-control console 20 in hands. This Wi-Fi link conveys in particular towards the drone the piloting controls intended to the drone 10, the angular components data of the direction according to which the user in immersion wishes to look at the scene taken by the camera 14 (as will be described hereinafter), and from the drone the video signal coming from the camera, herein framed in the drone by the above-mentioned processing means.

Finally, the console 20 is equipped with an inertial unit 38, preferably comprising a 3-axis accelerometer, a 3-axis magnetometer and a 3-axis pyrometer.

Figure 2:
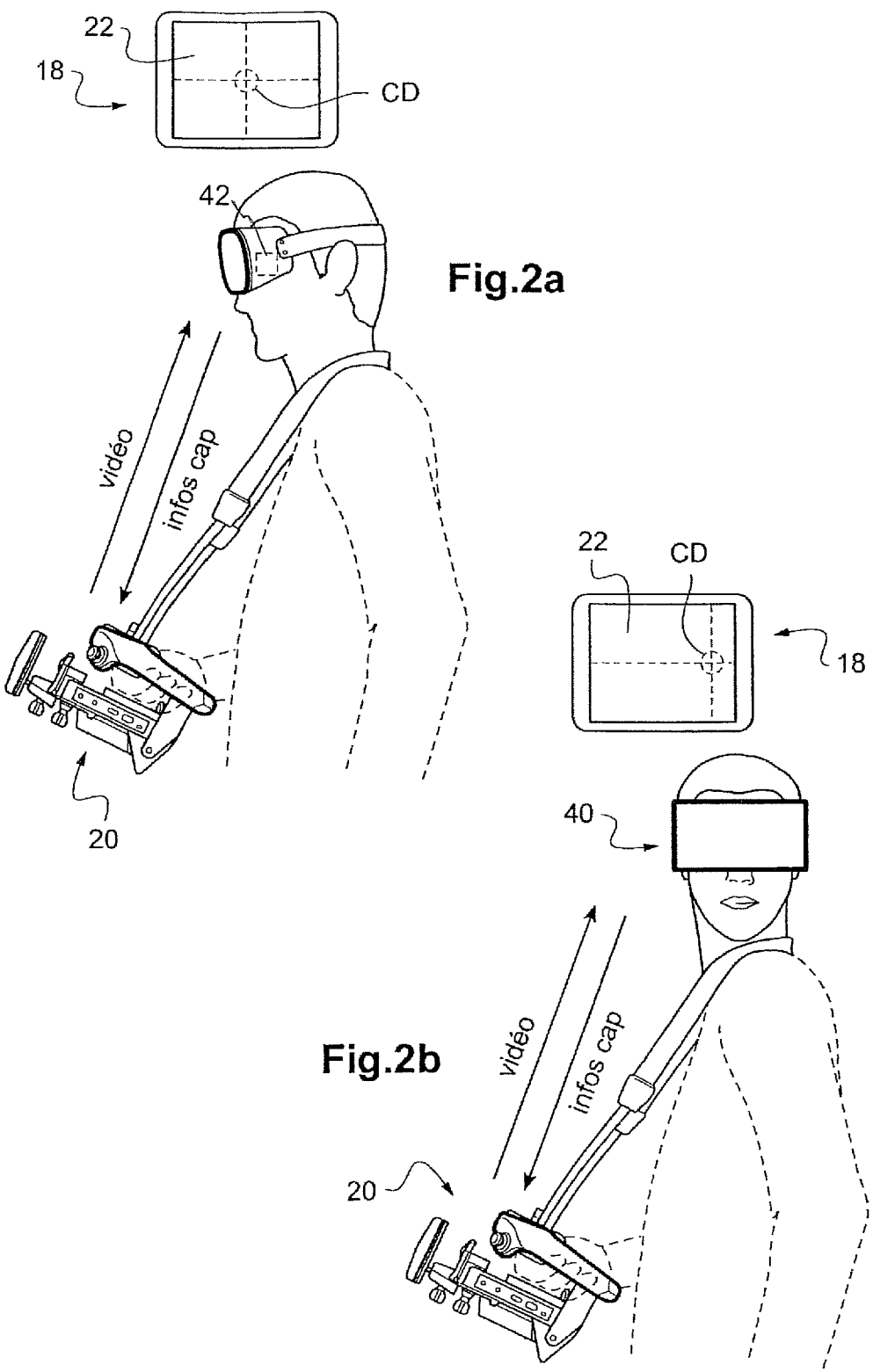
FIGS. 2a and 2b illustrate the unit of FIG. 1, complemented by immersive-mode piloting glasses according to the invention, for two different angular positions of the user's head.

With reference to FIGS. 2a and 2b, the console 10 is shown, with the virtual reality glasses 40 connected to the console through a wire or a wireless link, as described hereinabove, constituting a bidirectional communication channel.

For example, the glasses are of the Oculus Rift (Registered Trademark) type, marketed by the Oculus Company, Menlo Park, Calif., USA, connected to the console 20 through a HDMI and/or USB wire link, or glasses of the Zeiss VR One (Registered Trademark) type, these latter incorporating a portable phone replacing the tablet 18 and the link with the console 20 being then a wireless link.

The console 20 is adapted to communicate in an uplink direction with the glasses 40 so that the latter display a video image. In the simplest embodiment, this image is a copy of the image displayed on the visualization screen 22 of the tablet.

The glasses 40 are in this first embodiment equipped with an inertial unit schematically denoted by the reference 42, this inertial unit comprising in a manner known per se a 3-axis gyrometer, a 3-axis accelerometer and a 3-axis magnetometer.

According to the invention, the measures delivered by the inertial unit are transmitted to the console 20 by the downlink communication channel so as to control the framing of the image rendered by the camera 14 to the drone 10.

The general principle of the invention consists, when the user turns his head, in using the signals provided by the inertial unit 42 to determine the movement of the head and to deduce therefrom an angle of rotation of the latter, preferably consisted of a pitch angular component (upward, downward) and a yaw angular component (towards the left, towards the right).

The console transmits the values of these two angular components of the drone 10 so that the latter performs the processing of framing and correction of the great-angle image taken by its camera 14 to adapt the rendered image to the direction to which is turned the user's head.

So expressed, this functionality is however problematic. Indeed, the drone 10 and ground station 16 system described herein above imposes that the antenna 34 of the console is suitably oriented, at least approximately in the direction of the drone. This leads the user to turn his whole body that supports the ground station 16, and hence his head, to follow the position of the drone when the latter moves.

Now, it must be avoided that such a rotation is interpreted by the system as a rotation of the head for the purpose of looking to the left or to the right, and/or upward or downward.

If the framing of the image hence followed the rotation of the whole body of the user with the console, the user would rapidly loose his marks and the drone would become impossible to pilot in the wanted direction.

According to the invention, to modify the framing of the image taken by the camera 14 of the drone, the system will determine a relative angular position, in the yaw and pitch directions, between the virtual reality glasses 40 and the console 20, and control the framing of the image based on these data.

Figure 3:
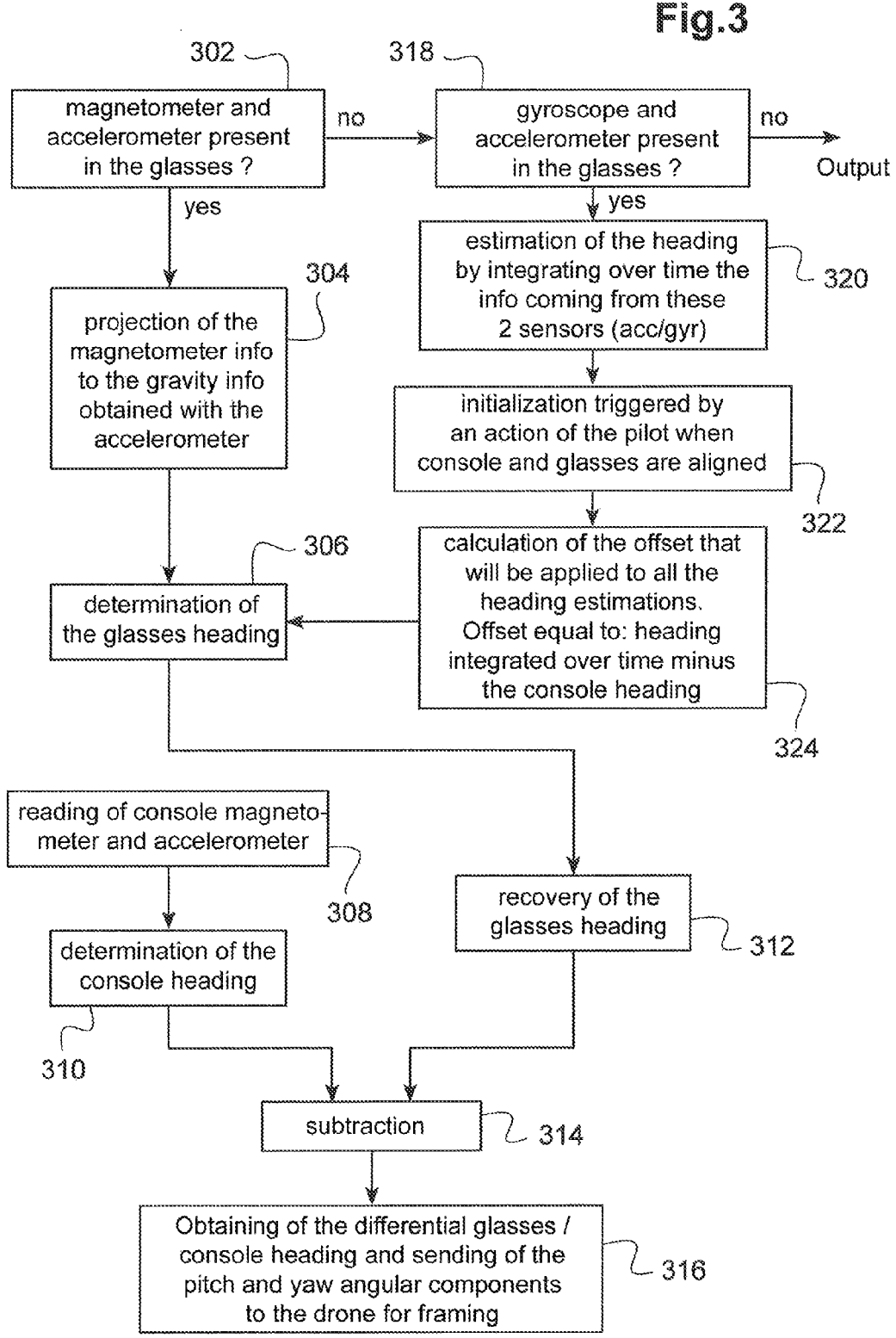
FIG. 3 is a logical diagram of the essential functions performed by the system of the invention.

The different operations implemented for that purpose will now be described with reference to FIG. 3.

First, at step 302, the system determines if the glasses 40 connected to the ground station are provided with autonomous means of determination of the absolute orientation of the glasses (with respect to the magnetic North), i.e. an inertial unit provided with a magnetometer and an accelerometer and, as the case may be, a gyrometer. In the affirmative, at step 304, the data coming from the magnetometer are projected to the information of gravity obtained with the accelerometer data, which makes it possible to determine the heading of the glasses, both in the pitch and yaw directions, at step 306.

These data are transmitted to the ground station 16 through the downlink communication channel. In the ground station, the data of the inertial unit 38 incorporated to the console 20 are used at step 308 to generate a value of console heading with respect to the magnetic North, at step 310.

The glass heading value is collected from the downlink transmission channel at step 312, and subtracted from the heading value of the console at step 314.

In the case where this difference is null, to within a rate of error, for example of a few degrees (case of FIG. 2a), it means that the user looks right in front of him, and that the framing of the fisheye image taken by the camera is made on the optical axis of the camera, i.e. in a centred manner. This is illustrated in upper part of FIG. 2a by the display, in super-imposition to the image, of a drone heading indicator CD, for example as a circle, corresponding to the optical axis of the camera and to the main axis of displacement of the drone 10, and hence to the optical centre of the image. This indicator is herein centred in the image displayed (both on the display 22 of the tablet 18 and on the display of the glasses 44).

In the case where the user has turned his head towards the left without turning his body (the console heading hence not changing), as illustrated in FIG. 2b, then step 314 determines a corresponding difference between the glasses heading and the console heading. This difference is materialized, herein, where the headings are determined both in the pitch and yaw directions, by an angular component of difference in pitch direction and an angular component of difference in yaw direction, and these components are sent to the drone 10 at step 316, so that the image processing in the latter ensures a corresponding framing of the fisheye image taken by the camera 14, this framed image being transmitted to the ground station 16, which itself transmits it to the virtual reality glasses 40.

This is illustrated in upper part of FIG. 2b by the fact that the framed image displayed on the display device 22 and on the glasses 40 is wholly located on the left of the drone heading indicator CD.

The differential heading measurement described at the previous steps is performed at regular intervals, for example from 10 to 100 times per second, in order to, each time, adjust the framing of the image taken by the camera 14 and render the framed image on the ground station 16 and on the glasses 40.

On the other hand, when the whole body and head of the user, as well as the ground station 16, turn as a same unit (in particular to adjust the orientation of the antenna 34 towards the drone 10), it causes no framing of the image.

An alternative embodiment of the invention will now be described, usable in the case where the virtual reality glasses are not equipped with a magnetometer.

This implementation may be made, for example, by providing in the software on board the tablet 18 a glasses-type recognition module from which the system is capable of determining which type of position and/or movement and/or acceleration detection means equip the glasses connected to the station 16 (having themselves, in a manner conventional per se, an immutable identifier of equipment type).

Hence, herein, contrary to the process described hereinabove, the step 302 has determined that the connected glasses, this time of a different model, was equipped with a gyrometer and an accelerometer, but not with a magnetometer (step 318).

It is understood that, in this case, the system in unable to determine an absolute heading for the glasses.

In this case, the system performs regularly (step 320) an estimation of the glasses heading by performing a time integration of the information coming from the accelerometer and from the gyrometer.

At step 322, an initialization is performed, according to which it is asked to the user to align the heading of the glasses (determined by the direction of the head) with the heading of the console 20, then to press a button of the console 20 (or a determined touch zone of the tablet 18).

At this time instant, a difference between the estimated heading of the glasses 40 and the heading of the console 20 measured at this time is determined and measured to serve as an offset value (step 324).

Afterwards, the current heading value is calculated at step 306 by application to the estimated value of the glasses heading, still obtained at step 320, of the offset determined at step 324.

Then, the process continues as described hereinabove.

Of course, the present invention is not limited to the embodiment described and shown, and the one skilled in the art will be able to make many variants and modifications of them. In particular:

- it applies to drones of various types, for inspection, leisure or other purposes, hovering or not;
- it applies to any type of virtual reality glasses, incorporating an inertial unit, or at least one accelerometer and one gyrometer (2-axis or 3 axis), or on which is fixed a distinct module having an inertial unit, or at least one accelerometer and one gyrometer (2-axis or 3 axis);
- the framing of the image as a function of the position of the head with respect to the console is performed at least according to the yaw angle, and preferably according to the yaw angle and pitch angle and, as the case may be, also taking into account the roll angle;
- the framing of the image may be of the software type, from a fisheye image taken by the video camera 14 (with, in a manner known per se, a processing of correction of the curves), or of the hardware type, the camera being then mounted, for example, on a motorized cradle, the optical sight angle of the camera being adjusted as a function the angular components in the yaw and pitch directions received from the ground station at step 316;
- the drone may not be equipped with a single camera, but equipped with a set of cameras, of identical or different definitions, having different optical sight angle, and whose images are combined to generate the image displayed in the glasses 40 and if need be on the display device 22;
- the processing operations of image framing and correction as a function of the angles of the user's head with respect to the console may be performed in the drone, in the ground station, or be distributed between both; if the virtual reality glasses have digital processing means provided with such an ability, a part of these processing operations may also be handled by the glasses;
- the virtual reality glasses may include a dedicated display system, or a smart terminal available on the market such as a smartphone or a tablet, added on the glasses.

The invention claimed is:

1. A drone immersion-piloting system comprising a drone (10) provided with imaging means (14) and a ground station (16, 40) communicating with the drone through a wireless link, the ground station comprising a console (20) adapted to be held by a user with respect to a body of said user, or fastened to said body of said user, the console being provided with a long-range directional antenna adapted to be directed by the user towards the drone to maintain the quality of the wireless link, the ground station further comprising virtual reality glasses (40) rendering images taken by means of the imaging means and transmitted from the drone through the wireless link, the system further comprising means for modifying the framing of the images taken by the imaging means (14) as a function of framing instructions received from the ground station, the system being characterized in that it further comprises:

relative heading determination means (302-324) for periodically elaborating an angular difference between the orientation of the glasses and the orientation of the console, and means (316) for elaborating framing instructions for the drone as a function of said angular difference, adapted to:
  i. cause framing when the user's head turns with respect to the console and hence with respect to the user's whole body, and
  ii. do not cause framing when the user turns the console with the user's whole body, head included.

2. The system according to claim 1, wherein the relative heading determination means comprise an inertial unit (38) associated with the ground station and processing means for determining a heading of the console with respect to a reference.

3. The system according to claim 2, wherein the inertial unit (38) associated with the console comprises a magnetometer, and the reference is constituted by the magnetic North.

4. The system according to claim 2, wherein the relative heading determination means comprise an inertial unit (42) associated with the glasses and processing means for determining a glasses heading with respect to a reference.

5. The system according to claim 4, wherein the inertial unit (42) associated with the glasses comprises a magnetometer, and the reference is constituted by the magnetic North.

6. The system according to claim 2, wherein the heading determination means comprise means (320) for estimating the glasses heading by integration of speed and/or acceleration data generated in the glasses, initialization means (322) for determining an offset between the console heading and the estimated heading of the glasses when a physical correspondence of heading between the console and the glasses is triggered by an operator, and means (324) for determining a corrected heading of the glasses from the estimated heading and the offset.

7. The system according to claim 2, wherein the relative heading determination means comprise means (314) of subtraction between the angular values of the console heading and of the glasses heading.

8. The system according to claim 1, wherein the orientation of the console and the orientation of the glasses comprise at least one yaw and/or pitch orientation.

9. The system according to claim 1, wherein the framing modification means comprise digital processing means for framing and correcting a fixed video image of the fisheye type taken by the imaging means (14).

10. The system according to claim 1, further comprising means for super-imposing to the image rendered in the virtual reality glasses a drone heading indicator (CD).

* * * * *